Patented May 29, 1923.

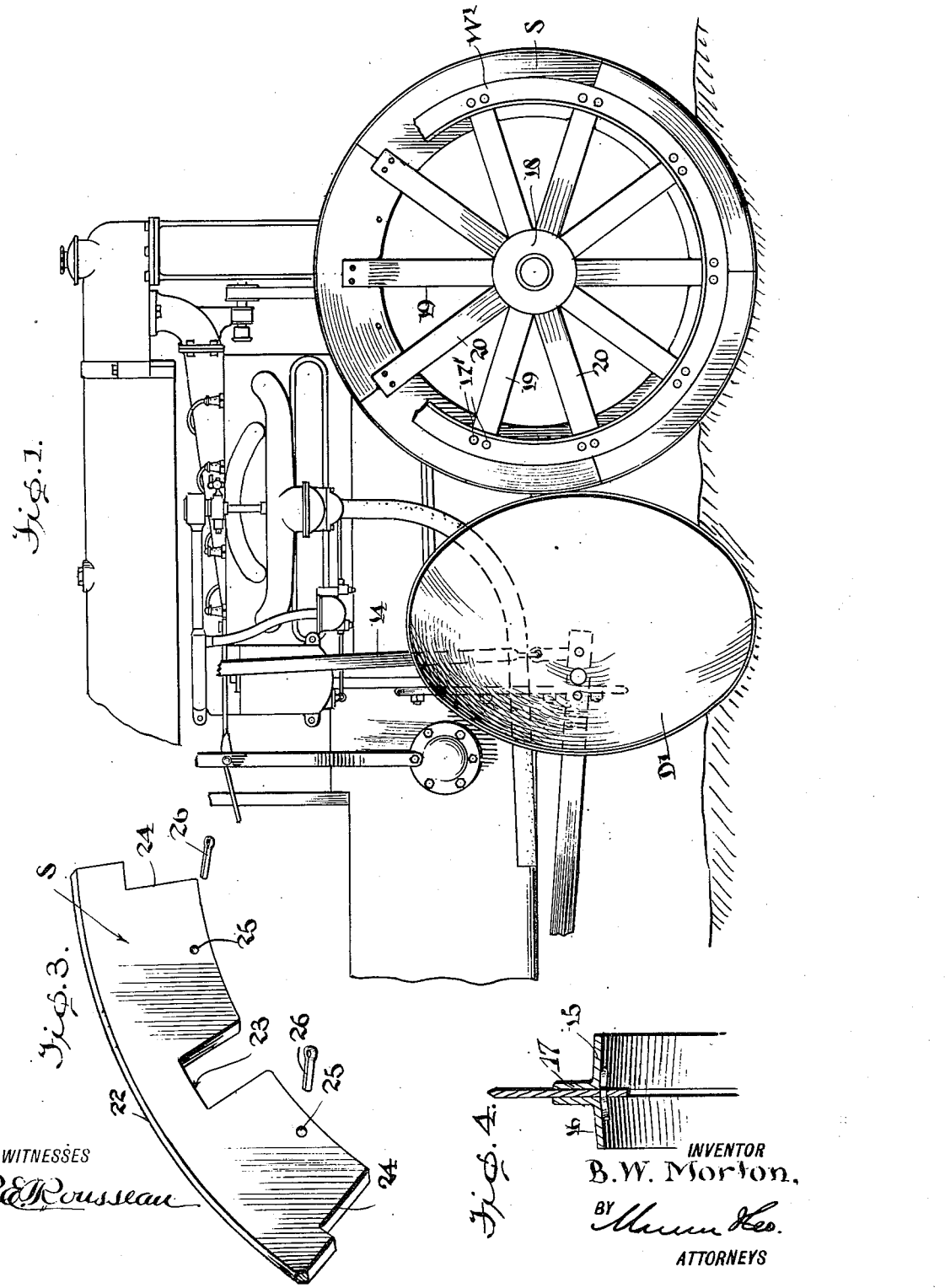

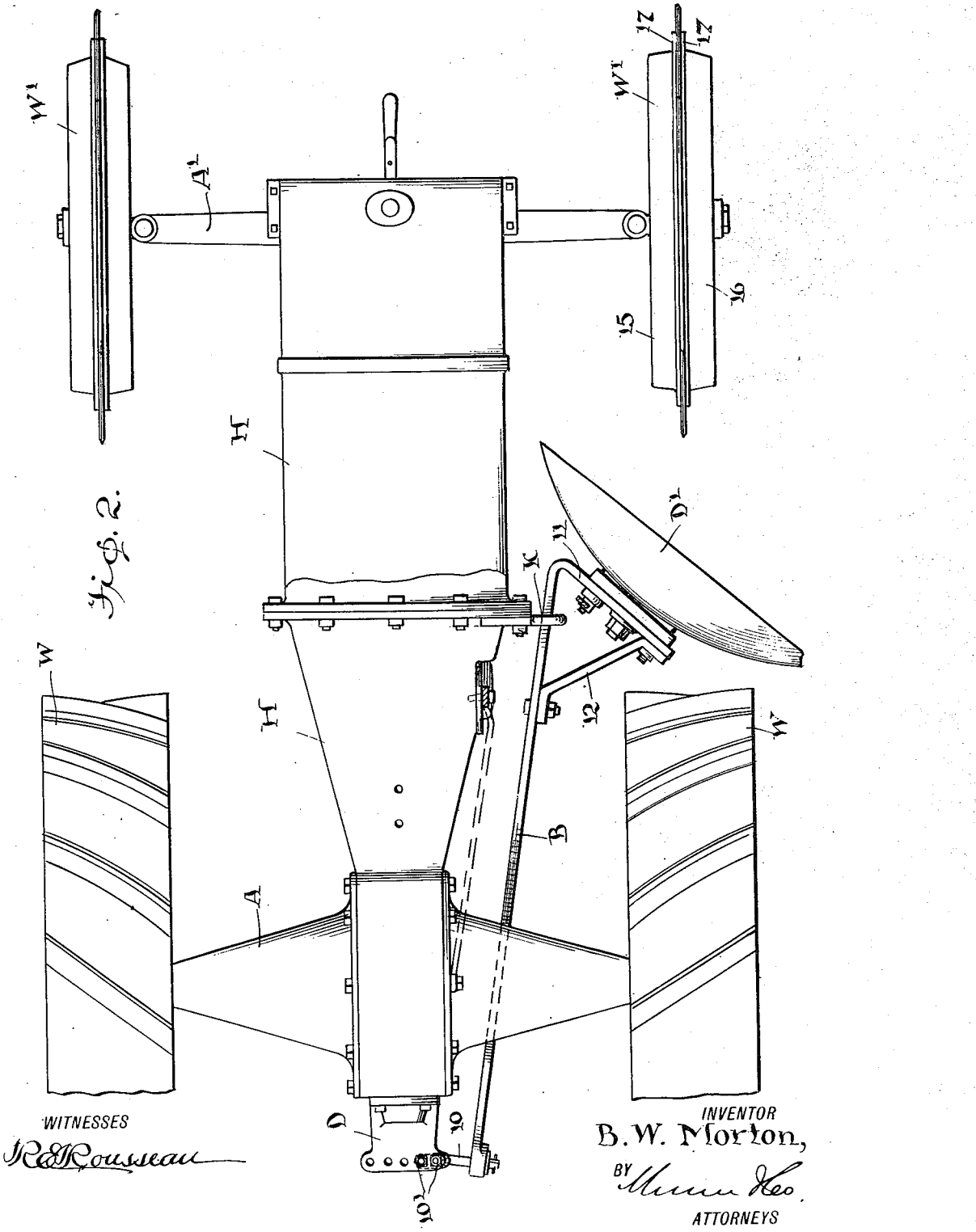

1,456,816

UNITED STATES PATENT OFFICE.

BENJAMIN W. MORTON, OF WILLISTON, FLORIDA.

WHEELED TRACTOR.

Application filed February 25, 1922. Serial No. 539,251.

*To all whom it may concern:*

Be it known that I, BENJAMIN W. MORTON, a citizen of the United States, and a resident of Williston, in the county of Levy and State of Florida, have invented certain new and useful Improvements in Wheeled Tractors, of which the following is a specification.

This invention relates to wheeled tractors and more particularly to plow and cutter attachments therefor. The plow attachment is disclosed in my pending application for patent Serial No. 526,262, filed December 31, 1921 and shown in the present application to illustrate its particular co-operative advantages for breaking or plowing a field when used in connection with the colter or cutter attachment.

The object of the invention is to provide a cutter or colter attachment for wheeled tractors which may be attached to the wheels of a tractor and serve to cut the earth to facilitate the breaking or plowing thereof and also serve to sever obstructions which may impede the progress of breaking or plowing the earth.

It is a further object of the invention that the cutter or colter attachment may be easily secured to the wheels of a tractor and at a low cost.

It is a still further object of the invention that the cutter attachment be durable and reliable in operation.

Other objects and advantages relating to details of construction, combination and arrangement of parts will hereinafter appear in the detailed description to follow.

The invention is illustrated by way of example in the accompanying drawings, in which:—

Figure 1 is a partial side elevation of a tractor illustrating the application of both the cutter and plowing attachments.

Figure 2 is a top plan view of a similar tractor and illustrating the application of both plow and colter attachments.

Figure 3 is an enlarged detail view of a section of the cutter and also showing pins for securing the same in position.

Figure 4 is a detail view further illustrating the manner in which the cutter sections are secured in position.

Similar reference numerals throughout the drawings refer to similar parts.

It may be here mentioned that the present invention is shown when associated with the so-called "Fordson" type of tractor for the purpose of identification.

Referring to the drawings more particularly, W indicates generally the rear drive wheels of the tractor and W' the front wheels thereof. Between the rear and front axle A and A' respectively, there is supported the housing sections H and mechanism therein. Connected with the rear axle A is the usual draw bar D.

Preferably the plow attachment comprises a bar B which is pivotally connected at its rear end to a brace 10, said brace being rigidly secured to the draw bar D by the means of bolts 10'. The forward end of the bar is supported for vertical movement within a slotted bracket member K. The forward portion of the bar B is bent rearwardly at at 11 and rotatably supports the plow disk D'. Also a suitable brace 12 is provided to support the forward end of the bar B. Through the means of a link 14 and ratchet and lever mechanism, not shown, the plow disk D' may be adjustably raised and lowered.

In a tractor of the type shown, the rim of a front wheel comprises two sections 15 and 16. These sections are each formed at their opposing edges with a flange 17, Figure 4. From the hub 18 of each wheel there extends two sets of spokes, namely 19 and 20; the spokes 19 occurring alternately and diverging from the spokes 20 as illustrated in Figure 1. The upper ends of these spokes are positioned between the flanges 17 of the rim sections 15 and 16 and secured by rivets 17', the rivets extending through the spokes and flanges. By this construction the flanges are spaced the thickness of the wheel spokes.

In carrying out the present invention relative to the colter or cutter, I provide a plurality of sections S, Figure 3. Each section being in the form of a plate arcuate in shape and having its outer periphery bevelled to form a cutting edge as at 22. Each section is also formed upon its inner edge with a recess 23 which is of the same width as either of the spokes 19 and 20 of the wheel W'. At each end of the cutter section S an offset 24 is provided which is one-half the width of the recess 23 and upon the two sections S being brought together to form a complete circle, the adjacent offsets 24 of the pair of sections will form a recess adapted to receive either of the spokes 19 or 20 of the wheel W'. Each section S is of substantially the same thickness as the two spokes 19 and 20. Also each section S is provided with a plurality of openings 25 adapted to receive a cotter pin 26 or like securing means.

In assembling or positioning a cutter upon a front wheel W', the sections S are positioned so that the inner peripheries thereof are between the flanges 17 of the wheel sections 15 and 16. The recesses 23 of the sections S will receive the outer ends of alternate wheel spokes while the recesses formed by the offsets 24 of the sections S will receive the remainder of wheel spokes. By this construction the cutter sections are seated upon the outer ends of the wheel spokes. The cutter sections, as shown in Figure 1, are five in number, although this is merely arbitrary and any number of sections may be used. The cotter pins 26 are positioned in the openings 25 to hold the cutter sections in position. It is of course obvious that if desired the sections S could be made integral and possibly secured in position without great difficulty.

The cutter sections are shown as applied to the front wheels of the tractor in that the construction of these wheels offer an easy application of the same, and also it is believed that cutters upon these wheels produce the best operative results.

In the operation of the present invention, as the tractor proceeds the disk D' is pushed ahead of the drive wheels W and cuts a furrow of considerable width; and by using the cutters upon the front wheels any obstructions such as roots, or the like, which may be in the earth are cut and thus not impeding the operation of the disk plow D'. Also it should be here mentioned that by cutting the earth previous to plowing the same the breaking of the earth by the disk plow is greatly facilitated.

It is also important to be here noted that in the use of a tractor for plowing equipped with cutters of the present invention, the steering of the tractor is made much easier. This is especially true when the tractor is used for breaking loose soil.

While I have shown my invention associated with a particular tractor and also with a particular type of plow, I wish it to be understood that I am aware of the fact that numerous advantages of the same may be obtained by employment with other types of tractors and with other types of plows; also that I am aware of the fact that slight changes may be made in the construction and application of the cutter sections without departing from the spirit of my invention as indicated by the appended claims.

I claim:

1. In combination, a wheeled tractor, a plow carried thereby and disposed in alignment with a wheel of the tractor and adapted to operate at the rear of said wheel, and means carried by said wheel to sever the earth over which the same passes.

2. In combination, a wheeled tractor, a plow carried thereby disposed in alignment with a front wheel of said tractor and adapted to operate at the rear thereof, and means carried by said front wheel whereby to sever the earth over which the same passes.

3. In combination, a wheeled tractor, a disk plow carried by said tractor, said disk plow being positioned at the rear of a wheel of said tractor and in alignment therewith and disposed at an angle to the longitudinal axis of the tractor, and means carried by the wheel associated with said plow whereby to sever the earth over which the wheel passes.

4. In combination, a wheeled tractor, a disk plow carried by said tractor and disposed in alignment with a front wheel of said tractor and also disposed to operate at an angle to the longitudinal axis of said tractor, and means carried by the front wheel adapted to sever the earth over which said wheel passes.

5. In combination, a wheeled tractor, a push bar pivotally secured at the rear end of said tractor and extending forwardly with relation thereto, a disk plow rotatably supported at the forward end of said push bar, and said disk plow being adapted to operate at the rear of the associated front wheel of said tractor, and means carried by said front wheel adapted to sever the earth a predetermined degree.

6. In combination, a wheeled tractor, a push bar pivotally secured at the rear end end of said tractor and extending forwardly with relation thereto, a disk plow rotatably supported at the forward end of said push bar, and said disk plow being adapted to operate at the rear of the associated front wheel of said tractor, and at an angle to the longitudinal axis of the tractor, and means carried by said front wheel of the tractor adapted to sever the earth over which said wheel passes.

BENJAMIN W. MORTON.